Figure 1:
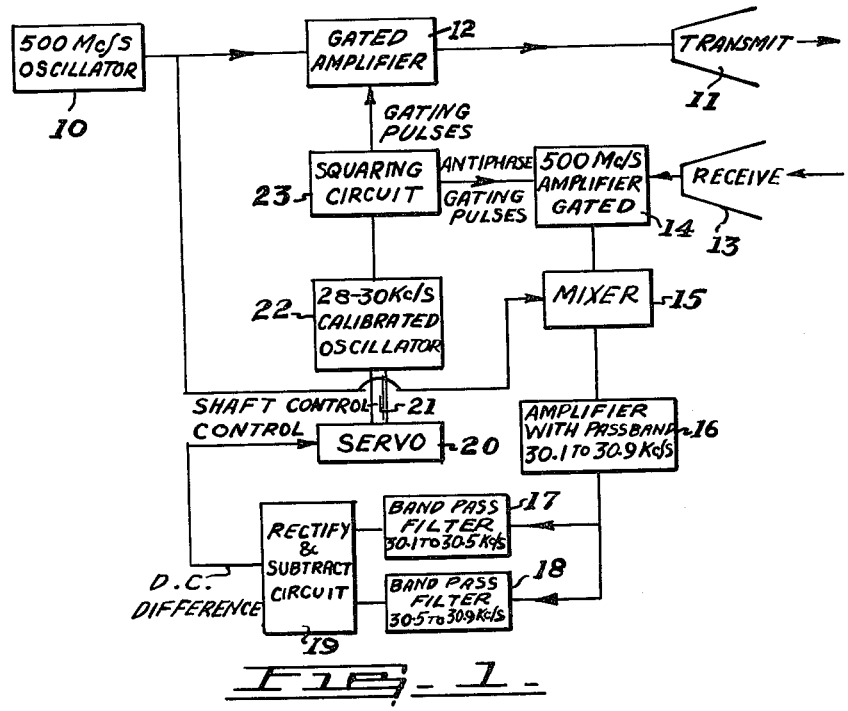

INVENTOR
WALTER W.H. CLARKE
By Smart & Biggar
ATTORNEYS

INVENTOR
WALTER W. H. CLARKE
By— Smart & Biggar
ATTORNEYS

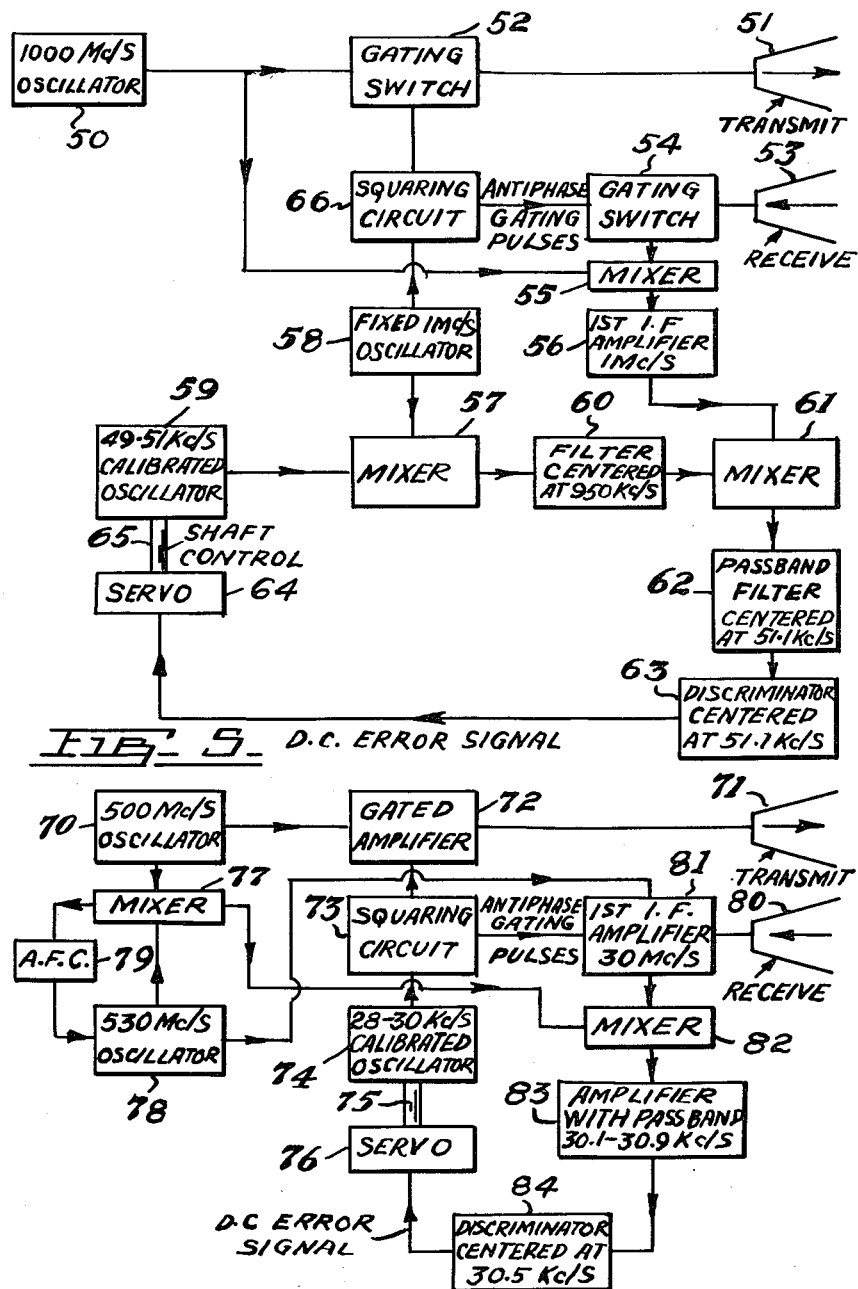

United States Patent Office 3,009,143
Patented Nov. 14, 1961

3,009,143
DOPPLER RADAR SYSTEM
Walter W. H. Clarke, City View, Ontario, Canada, assignor to Her Majesty the Queen in right of Canada as represented by the Minister of National Defence
Filed Sept. 26, 1956, Ser. No. 612,330
Claims priority, application Canada July 4, 1956
8 Claims. (Cl. 343—8)

The invention relates to a Doppler radar system for measuring the speed of one object relative to another. The system is particularly well adapted for use in an aircraft to measure ground speed.

In its simplest form, a previously known continuous wave Doppler system for ground speed measurement in aircraft mixes the returned Doppler-shifted signal with a signal direct from the transmitter thereby producing a difference frequency which falls in the audio range. Measurement of this difference frequency provides a measure of ground speed of the aircraft. However, serious difficulty is encountered with receiver noise because the actual Doppler shifted frequency is in the audio frequency range and poor noise factors are obtained in receivers which amplify very small signals in that range.

The present inventor avoids the disadvantages of the prior art systems by using a continuous-wave Doppler system in which the radiated carrier signal from the transmitter is modulated by off-on switching (equal or unequal square wave modulated) thereby producing sidebands which along with the carrier signal are Doppler-shifted upon reflection. The present inventor discovered that, when the radiated carrier signal from the transmitter is switched off and on at a frequency sufficiently high to be consistent with the time taken for the signal to travel to the ground and return at the lowest altitudes at which the system is to work, a substantially higher frequency of modulation is required than the Doppler frequency (difference frequency between the transmitted frequency and the received frequency). The present inventor further found that he could measure or indicate the Doppler frequency by deriving from the reflected signal at the receiver, a Doppler-shifted modulation-frequency signal. One way to measure the Doppler frequency from such a derived signal is to vary the modulating frequency in a controlled manner so as to alter the frequency of the derived signal in a measuring arrangement with fixed filters or a discriminator. Also by using discriminating action, the derived signal could be used to control automatically the frequency of the oscillator which provides the square wave off-on modulation of the radiated carrier signal. With this arrangement the degree of adjustment of the oscillator at any instant is a measure of the Doppler frequency and therefore, in the case of use of the system on an aircraft to measure ground speed, of the speed of the aircraft relative to the ground.

The invention provides the important advantage that the receiver is tuned to a substantially higher frequency than the Doppler frequency thus improving the noise factor. Another important advantage is in simplification of the equipment required by the elimination of a number of frequency changes through using a square wave modulator as a calibrated oscillator to measure the Doppler frequency.

In the case of a simple Doppler ground-speed measuring system for aircraft operating from two beams, one slanting forward and the other aft, it is possible to measure the apparent ground speeds given by the returns from the two beams, and the true ground speed is obtained from the average of the two measurements. The two measurements may be time coincident and employ duplicated components or may each operate for nearly 50% of the time using the same measuring equipment. This averaging procedure is preferable to measuring ground speed from the forward or aft beam alone because it involves a less stringent requirement for stability of a horizontal platform supporting the antennae. Also it eliminates rate of change of height from the ground-speed measurement.

Figure 2:
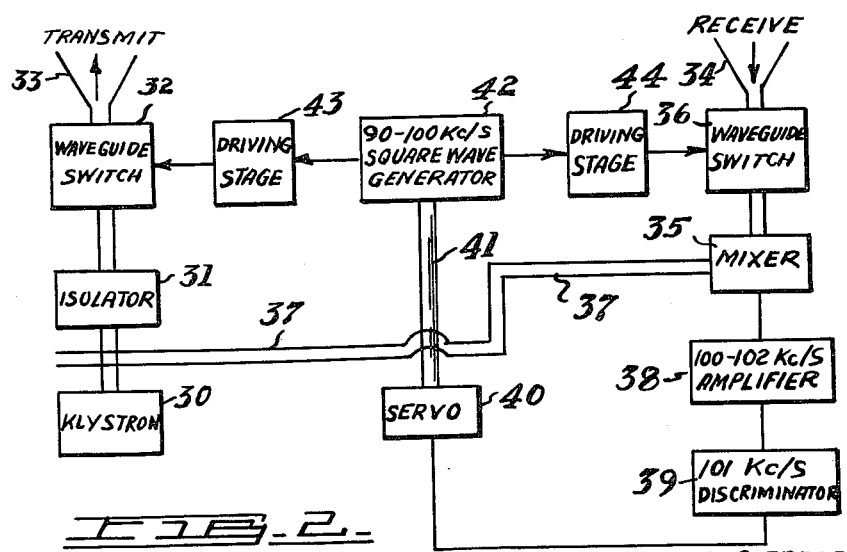
Figure 3:
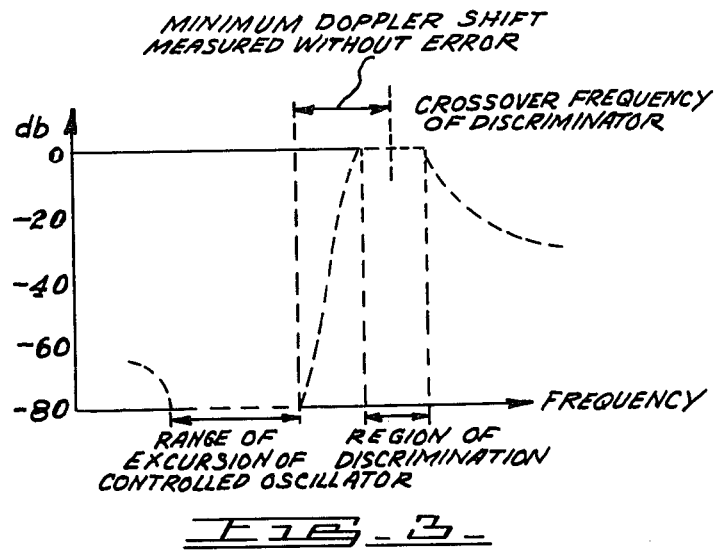
Figure 4:
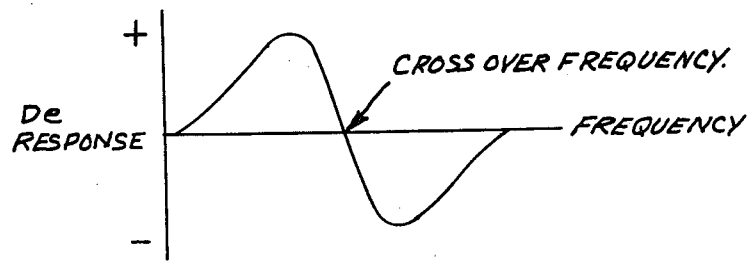

The invention will be further described with reference to the accompanying drawings, in which FIGURE 1 is a schematic diagram of a Doppler radar system according to the invention adapted for transmission at a carrier frequency in the order of 500 megacycles, FIGURE 2 is a block schematic diagram of a Doppler radar system in accordance with the invention adapted for transmission at a frequency in the order of 10,000 megacycles per second;

FIGURE 3 is a graph illustrating the response which would be required in a receiver for a system as shown in FIGURES 1 or 2 without time sharing, FIGURE 4 is a graph showing a typical discriminator characteristic, and FIGURES 5 and 6 are block schematic diagrams of other embodiments of the invention.

The block diagram shown in FIGURE 1 is for a system in which transmission is by a carrier frequency in the order of 500 megacycles per second. The carrier frequency originates in an oscillator 10 and is fed to the transmitter antenna 11 through a gated amplifier 12. The gating pulses supplied to the amplifier 12 are controlled in frequency by the receiving circuits which are fed from a receiver antenna 13. The receiving antenna 13 is connected to a gated amplifier 14 and the amplified signal from the gated amplifier 14 is fed to one of the inputs of a mixer circuit 15. The other input of the mixer circuit 15 is derived direct from the transmitter oscillator 10. The difference signal produced in the mixer 15 is fed to an amplifier 16 having a passband from 30.1 to 30.9 kilocycles per second. The output from the amplifier 16 is divided and fed to a pair of band pass filters 17 and 18. The band pass filter 17 passes frequencies from 30.1 to 30.5 kilocycles per second while the band pass filter 18 passes frequencies from 30.5 to 30.9 kilocycles per second. The outputs of the band pass filters 17 and 18 are rectified and subtracted in the rectify and subtract circuit 19 and the direct current difference output signal from the circuit 19 is fed as a control signal to a servo unit 20. The control shaft 21 of the servo unit 20 is used to adjust the frequency of a calibrated oscillator 22 which produces a frequency of from 28 to 30 kilocycles per second. The output of the calibrated oscillator 22 is fed through a squaring circuit 23 to provide square wave gating pulses to the gated amplifier 12, and antiphase gating pulses to the gated amplifier 14. The antiphase gating pulses may not be required if there is little leakage from the transmitter antenna direct to the receiver antenna.

The circuit described is suitable for a carrier frequency in the neighborhood of 500 megacycles per second. The actual frequencies referred to in the description of the circuit are examples of typical frequencies which might be used. In the circuit shown when the carrier frequency is 500 megacycles per second and it is square wave modulated at from 28 to 30 kilocycles per second. The system works on a time-shared basis, that is, the times of transmission and reception are alternated as provided for by the gated amplifiers 12 and 14 being under control of gating pulses in antiphase relationship. The system measures Doppler shift frequencies between 0.5 and 2.5 kilocycles per second. The band pass filters 17 and 18 can be constructed with conventional inductances and capacitances and can be symmetrical mid-shunt m-derived band pass sections. The outputs of the band pass filters after rectification and subtraction are made to control a servo unit which sets the frequency of the square-wave gating pulses.

In operation the gated amplifier 12 switches off and on the energy being supplied to the transmitter antenna 11 at a frequency determined by the calibrated oscillator 22. The frequency of the calibrated oscillator 22, for example, is adjustable from 28 to 30 kilocycles per second but in general it must be a frequency sufficiently high to be consistent with the time taken for the signal to travel to the ground and to return. The operation of the gated amplifier 12 in effect provides square wave modulation of the 500 megacycle per second carrier signal being fed to the transmitter antenna 11. The frequency of the transmitted carrier signal and the frequencies of the sidebands resulting from the modulation of the carrier signal are Doppler-shifted upon reflection from objects which are moving relative to the transmitter. The receiver amplifier 16, which has a pass band of 30.1 to 30.9 kilocycles per second, operates to isolate a Doppler-shifted modulation-frequency signal from the reflected energy from the transmitter and it passes this signal through the band pass filters 17 and 18, having a combined centre frequency of 30.5 kilocycles per second, to the rectify and subtract circuit 19 which produces a direct current control voltage dependent on the deviation in frequency of the Doppler-shifted modulation-frequency signal from 30.5 kilocycles per second. The direct current control signal at the output of the rectify and subtract circuit 19 is a measure of the deviation of the actual Doppler shift from that indicated by the setting of the calibrated oscillator 22. The direct current control signal causes the servo unit 20 to adjust the calibrated oscillator 22 in a direction tending to bring the signal fed to the band pass filters 17 and 18 to the mid-point of their combined band pass, namely 30.5 kilocycles per second. The setting of the frequency of the oscillator 22 to effect this adjustment of the received signal is a measure of the Doppler shift and so that the Doppler shift can be indicated by the calibration of the oscillator 22. In this way the ground speed of an aircraft can be indicated continuously by the frequency setting of the calibrated oscillator 22.

In many respects the system shown in FIGURE 2 is similar to that shown in FIGURE 1, but the system shown in FIGURE 2 is adapted for use at a much higher frequency, for example, in the order of 10,000 megacycles per second. The 10,000 megacycles per second carrier frequency is generated in a klystron oscillator 30 and fed by waveguides through an isolator 31 to a waveguide switch 32 which connects to the transmitter antenna 33. The waveguide switch 32 is switched on and off at a frequency of 90 to 100 kilocycles per second under the control of the receiving circuits which are fed from the receiver antenna 34. The receiver antenna 34 is connected to a mixer circuit 35 by a waveguide circuit which includes a waveguide switch 36. The other input of the mixer circuit 35 is taken from the output of the klystron 30 by a waveguide connection 37. The difference signal at the output of the mixer circuit 35 is fed through a 100 to 102 kilocycles per second bandpass amplifier 38 to a 101 kilocycles per second discriminator circuit 39. The output of the discriminator 39 is a direct current error signal which is fed as a control signal to a servo unit 40. The servo unit 40 has a control shaft 41 connected to a square wave generator 42 for adjustment of its frequency. The square wave generator 42 is adjustable from 90 to 100 kilocycles per second and has output connections through driving stages 43 and 44 to the wave-guide switches 32 and 36. The off-on switching of each of the wave-guide switches 32 and 36 is controlled in frequency according to the frequency setting of the square wave generator 42 so that transmission and reception are alternated at a frequency in the range of 90 to 100 kilocycles per second.

The operation of the circuit shown in FIGURE 2 corresponds to that of the circuit shown in FIGURE 1. The action of the discriminator 39 is equivalent to that of the band pass filters 17 and 18 and the rectify and subtract circuit 19 shown in FIGURE 1. A typical discriminator characteristic is shown in FIGURE 4. The wave-guide switches 32 and 36 are of known construction and may be of the type which use ferrites in the wave-guides.

An alternative arrangement to the time sharing system using wave-guide switches 32 and 36 is to use a grid controlled amplifying klystron in the transmitter circuit while leaving the receiver antenna open to feed a signal continuously to the mixer circuit. In this arrangement it is necessary to remove signals leaking direct from the transmitter antenna to the receiver antenna by filtering. This may become difficult in the presence of noise side bands on the leak carrier in the case of systems operating on very small received signals, for example in aircraft being navigated at heights in excess of 20,000 feet. FIGURE 3 shows an example of the response of a filter for a receiver without time sharing. The curves shown in FIGURE 3 indicate a band pass filter for the receiver signal having a rejection of 80 decibels over the range of excursion of the controlled oscillator and having a flat response over the range of frequencies to which the discriminator is sensitive. This assumes that the receiver is not desensitised at all and separate antennas are relied upon which can provide isolation of the receiver from the transmitter approaching 70 decibels. Full time sharing is substantially better for dealing with leak signals and noise side bands.

The block diagram of FIGURE 5 shows a system in which the pulse repetition frequency of the square wave modulation of the transmitted signal can be set at a very high value, for example, 1 megacycle per second, thereby obtaining a better noise factor than is obtained with lower frequencies. As shown in FIGURE 5 a carrier frequency of 1,000 megacycles per second is generated by an oscillator 50 and fed to the transmitter antenna 51 through a gating switch 52 which modulates the carrier in a manner to be described below. The modulated carrier is transmitted and after reflection is returned to the receiver antenna 53 and thence through a gating switch 54 to a mixer 55. The mixer 55 is also fed with a signal direct from the 1,000 megacycle per second oscillator 50 and the resultant signal from the mixer 55 is fed to a first intermediate frequency amplifier 56 which operates at 1 megacycle per second. A mixer 57 has inputs from a fixed 1 megacycle per second oscillator 58 and from a 49 to 51 kilocycle per second calibrated oscillator 59. The resultant signal from the mixer 57 is fed through a filter 60 centered at 950 kilocycles per second to a mixer 61. The other input to the mixer 61 is from the amplifier 56 and the resultant signal from the mixer 61 is fed through a pass band filter 62 centered at 51.1 kilocycles per second to a discriminator 63 centered at 51.1 kilocycles per second. The discriminator 63 produces a direct current error signal which varies according to the deviation in frequency of the signal from the pass band filter 62 from the centre frequency of the discriminator 63. The direct current error signal is taken to a servo mechanism 64 causing it, through its control shaft 65, to adjust the setting of the calibrated oscillator 59. The direct current error signal is a measure of the deviation of the actual Doppler shift from that indicated by the setting of the calibrated oscillator 59 and it continuously causes adjustment of the calibrated oscillator 59 to keep the signal fed to the discriminator 63 centered at 51.1 kilocycles per second. The oscillator 58 also supplies a signal through a squaring circuit 66 to the gating switch 52 thereby controlling off-on switching (modulation) of the carrier signal to the transmitter antenna 51. Antiphase gating pulses are supplied to the gating switch 54 from a squaring circuit 66 so that the periods of reception are alternated with the periods of transmission. However, it may not always be essential to do this, and the receiver antenna 53 can be connected direct to the mixer 55.

The circuit shown in FIGURE 5 permits setting of the pulse repetition frequency at a very high value, for example, at 1 megacycle per second resulting in a 1 megacycle intermediate frequency and therefore a greatly improved noise factor is obtained. The oscillator 58 which sets the pulse repetition frequency is a fixed oscillator and preferably is crystal controlled.

A circuit as shown in FIGURE 6 which will provide a still greater improvement in noise factor because the intermediate frequency amplifier can be operated at a much higher frequency. The transmitter carrier frequency is generated in a 500 megacycle per second oscillator 70 and fed to the transmitter antenna 71 through a gated amplifier 72. The gated amplifier 72 operates as an on-off switch to modulate the carrier signal under control of pulses from a squaring circuit 73 and a 28 to 30 megacycles per second calibrated oscillator 74 of which the frequency setting is controlled through a shaft 75 from a servo mechanism 76. A 500 megacycle per second signal is taken from the oscillator 70 to a mixer circuit 77 of which the other input is obtained from a 530 megacycle per second oscillator 78. An automatic frequency control circuit 79 is provided to maintain the accuracy of the frequency of the signal from the oscillator 78.

In FIGURE 6 the transmitted signal upon reflection is received by the receiver antenna 80 and supplied to the first intermediate frequency amplifier 81 which operates at 30 megacycles per second. The 30 megacycle per second signal amplified in the amplifier 81 is obtained by mixing the received 500 megacycle per second signal with a 530 megacycle per second signal from the oscillator 78. If desired, and as shown in the diagram, antiphase gating pulses can be supplied to the amplifier 81 to gate it so that the periods of reception are alternated with the periods of transmission. The 30 megacycle per second output signal from the amplifier 81 is fed to one of the inputs of a mixer circuit 82 and the other input circuit of the mixer circuit 82 is fed with a 30 megacycle per second signal from the mixer 77. The output signal from the mixer 82 is connected to an amplifier 83 having a pass band from 30.1 to 30.9 kilocycles per second so as to isolate a Doppler-shifted modulation-frequency component of the received signal. The output of the amplifier 83 is supplied through a discriminator 84 centered at 30.5 kilocycles per second to supply a direct current error signal to the servo mechanism 76. The direct current error signal to the servo mechanism 76 controls it to adjust the position of the shaft 75 thereby adjusting the frequency setting of the calibrated oscillator 74.

The direct current error signal in FIGURE 6 varies according to deviation in frequency of the signal from the amplifier 83 from the centre frequency of the discriminator 84. Accordingly the direct current error signal is a measure of the deviation of the actual Doppler shift from that indicated by the setting of the calibrated oscillator 74, and the direct current error signal continuously adjusts the calibrated oscillator 74 to keep the signal fed to the discriminator 84 substantially at 30.5 kilocycles per second. Accordingly the frequency setting of the calibrated oscillator 74 at any instant is an indicator of the Doppler frequency.

Doppler systems according to the invention for measuring ground speed have the important advantage that good noise factors are obtained because of operation of amplifier circuits in the receiver at a much higher frequency than the Doppler shift frequency, for example, at a frequency in the order of 30 to 100 kilocycles per second as in FIGURES 1 and 2 or at 1 to 30 megacycles per second as in FIGURES 5 and 6. The equipment according to the invention is simplified by the elimination of a number of frequency changes over that previously required through use of the square wave modulating circuits as a calibrated oscillator to measure ground speed. The various individual pieces of equipment indicated in FIGURES 1, 2, 5 and 6 as required for a system in accordance with the invention are conventional pieces of equipment and commercially available or readily designed by people skilled in this art.

What I claim as my invention is:

1. A Doppler radar system comprising, a source of radio frequency carrier signal, modulating means adapted to off-on switch said carrier signal at a frequency higher than the audio range of frequencies thereby producing a modulated carrier signal, means for radiating the modulated carrier signal so that it can be reflected back to said system and thereby shifted in frequency by an amount called the Doppler frequency, receiving means adapted to derive a Doppler-shifted modulation-frequency signal from the reflected modulated carrier signal and indicating means responsive to the derived signal for obtaining an indication of the Doppler frequency.

2. A Doppler radar system as claimed in claim 1 in which the modulating means comprises switching means adapted to square wave modulate the radio frequency energy by off-on switching before radiation, said modulating means being adapted to provide off-on control of the receiving means, the off-periods of the receiving means coinciding with the on-periods of the radiated radio-frequency energy and vice versa.

3. A Doppler radar system as claimed in claim 1 in which the modulating means comprises oscillator means for producing square wave energy of which the frequency can be adjusted, and switching means adapted to be controlled by said square wave energy to set the frequency of the off-on switching of the radio frequency energy.

4. A Doppler radar system as claimed in claim 3 in which the indicating means comprises discriminator means adapted to provide discriminating action at a predetermined frequency of said derived signal thereby providing a control signal which varies with deviation of the frequency of said derived signal from said predetermined frequency; said system comprising a servo device controlled by said control signal, said servo device being adapted to adjust the the frequency of the oscillator means to maintain the frequency of said derived signal substantially at said predetermined frequency, and means to indicate the degree of adjustment of said oscillator means.

5. A Doppler radar system as claimed in claim 1 in which the indicating means comprises discriminator means adapted to provide discriminating action at a predetermined frequency of said derived signal thereby providing a control signal which varies with deviation of the frequency of said derived signal from said predetermined frequency; said system comprising a servo device controlled by said control signal, said servo device being adapted to adjust the modulating frequency of the modulating means to maintain the frequency of said derived signal substantially at said predetermined frequency, and means to indicate the degree of adjustment of the modulating means.

6. A Doppler radar system as claimed in claim 1 in which the receiving means comprises a mixer adapted to mix the received signal with unmodulated radio frequency carrier signal from the source of radio frequency crarier signal thereby obtaining said derived signal.

7. A Doppler radar system as claimed in claim 6 comprising, means for mixing said derived signal with a variable controlled signal from the modulating means thereby obtaining a controllable difference frequency, the indicating means including discriminator means adapted to provide discriminating action at a predetermined frequency in the range of variation of said difference frequency thereby providing a control signal which varies with deviation of the frequency of said difference frequency from said predetermined frequency, and means adapted to be controlled by said control signal to adjust said variable controlled signal to maintain said difference frequency substantially at said predetermined frequency.

8. A Doppler radar system as claimed in claim 1 in which the modulating means is adjustable in frequency over a range substantially equivalent to the range in frequency of the Doppler frequencies to be indicated; said system comprising a source of automatic frequency controlled signal having its frequency accurately maintained at predetermined difference X in frequency from the frequency of the transmitted radio frequency carrier signal, means for mixing the signal received at the receiving means with the automatic frequency controlled signal and for amplifying the difference frequency resultant signal, means for mixing said resultant signal with a signal of frequency X thereby producing a second resultant signal, discriminator means adapted to provide discriminating action at a predetermined frequency in the range of variation of the second resultant signal thereby providing a control signal which varies with deviation of the frequency of the second resultant signal from said predetermined signal, and means responsive to said control signal for adjusting the frequency of said modulating means to maintain the frequency of the second resultant signal substantially at said predetermined frequency.

References Cited in the file of this patent

UNITED STATES PATENTS

| | | |
|---|---|---|
| 2,416,895 | Bartelink | Mar. 4, 1947 |
| 2,520,166 | Page | Aug. 29, 1950 |